(12) United States Patent
Yahia et al.

(10) Patent No.: US 7,974,976 B2
(45) Date of Patent: Jul. 5, 2011

(54) DERIVING USER INTENT FROM A USER QUERY

(75) Inventors: Sihem Amer Yahia, New York, NY (US); Jayavel Shanmugasundaram, Santa Clara, CA (US); Utkarsh Srivastava, Santa Clara, CA (US); Erik Vee, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 242 days.

(21) Appl. No.: 11/750,512

(22) Filed: May 18, 2007

(65) Prior Publication Data

US 2008/0114759 A1 May 15, 2008

Related U.S. Application Data

(63) Continuation-in-part of application No. 11/595,585, filed on Nov. 9, 2006.

(51) Int. Cl.
*G06F 17/30* (2006.01)
(52) U.S. Cl. .................. 707/736; 707/742; 707/708
(58) Field of Classification Search .................. 707/736, 707/708, 742, 999.001–7, 999.1–102
See application file for complete search history.

(56) References Cited

U.S. PATENT DOCUMENTS

| | | | |
|---|---|---|---|
| 6,269,361 B1 | 7/2001 | Davis et al. | |
| 6,377,935 B1 | 4/2002 | Deaton et al. | |
| 6,516,312 B1 * | 2/2003 | Kraft et al. | 707/610 |
| 6,714,929 B1 | 3/2004 | Micaelian et al. | |
| 7,031,932 B1 | 4/2006 | Lipsky et al. | |
| 7,225,182 B2 | 5/2007 | Paine et al. | |
| 7,231,358 B2 | 6/2007 | Singh et al. | |
| 7,272,597 B2 * | 9/2007 | Chowdhury et al. | 1/1 |
| 7,363,302 B2 | 4/2008 | Lester | |
| 7,523,095 B2 * | 4/2009 | Gates et al. | 1/1 |
| 7,565,630 B1 * | 7/2009 | Kamvar et al. | 1/1 |
| 7,660,734 B1 | 2/2010 | Neal et al. | |
| 2002/0169759 A1 * | 11/2002 | Kraft et al. | 707/3 |
| 2003/0101126 A1 | 5/2003 | Cheung et al. | |
| 2003/0144924 A1 | 7/2003 | McGee | |
| 2004/0133471 A1 | 7/2004 | Pisaris-Henderson et al. | |

(Continued)

FOREIGN PATENT DOCUMENTS

JP 2001-142972 A 5/2001

(Continued)

OTHER PUBLICATIONS

U.S. Patent and Trademark Office Action dated Jan. 8, 2009 for U.S. Appl. No. 11/734,294.

(Continued)

*Primary Examiner* — Debbie Le
(74) *Attorney, Agent, or Firm* — Brinks Hofer Gilson & Lione

(57) ABSTRACT

A system and method for deriving user intent from a query. The system includes a query engine, and an advertisement engine. The query engine receives a query from the user. The query engine analyzes the query to determine a query intent that is matched to a domain. The query may be further analyzed to derive predicate values based on the query and the domain hierarchy. The domain and associated information may then be matched to a list of advertisements. The advertisement may be assigned an ad match score based on a correlation between the query information and various listing information provided in the advertisement.

22 Claims, 6 Drawing Sheets

U.S. PATENT DOCUMENTS

| | | | |
|---|---|---|---|
| 2005/0021387 A1 | 1/2005 | Gottfurcht | |
| 2005/0189414 A1 | 9/2005 | Fano et al. | |
| 2006/0069614 A1 | 3/2006 | Agarwal et al. | |
| 2006/0117002 A1* | 6/2006 | Swen | 707/4 |
| 2006/0242017 A1 | 10/2006 | Libes et al. | |
| 2007/0078880 A1* | 4/2007 | Eiron et al. | 707/102 |
| 2007/0118392 A1 | 5/2007 | Zinn et al. | |
| 2007/0233730 A1 | 10/2007 | Johnston | |
| 2007/0250468 A1* | 10/2007 | Pieper | 707/1 |
| 2007/0266016 A1* | 11/2007 | Holmes et al. | 707/4 |
| 2007/0271255 A1* | 11/2007 | Pappo | 707/5 |
| 2007/0282811 A1* | 12/2007 | Musgrove | 707/3 |
| 2008/0065463 A1 | 3/2008 | Rosenberg et al. | |
| 2008/0104061 A1* | 5/2008 | Rezaei | 707/5 |
| 2008/0126191 A1 | 5/2008 | Schiavi | |
| 2008/0215564 A1* | 9/2008 | Bratseth | 707/5 |
| 2008/0313164 A1 | 12/2008 | Lee et al. | |

FOREIGN PATENT DOCUMENTS

| | | |
|---|---|---|
| JP | 2002-083173 A | 3/2002 |
| KR | 2001-0094780 A | 11/2001 |
| KR | 10-2005-0067239 A | 6/2005 |
| KR | 10-2006-026770 A | 3/2006 |
| WO | WO 01/06403 A2 | 1/2001 |

OTHER PUBLICATIONS

J.L. Bentley, *Multidimensional Binary Search Trees Used for Associative Searching*, Commun. ACM 18(9): 509-517 (1975).

N. Bruno, S. Chaudhuri, L. Gravano, *Top-K Selection Queries Over Relational Databases: Mapping Strategies and Performance Evaluation*, ACM Transactions on Database Systesm (TODS), 28(2), 2002.

M.J. Carey, D. Kossmann, *On Saying "Enough Already?" in SQL*, SIGMOD Conference 1997.

F. Chu, J.Y. Halpern, P. Seshadri, east *Expected Cost Query Optimization: An Exercise in Utility*, PODS Conference 1999.

C. Chen, Y. Ling, *A Sampling-Based Estimator for Top-K Query*, ICDE Conference 2002.

Y. Diao, P. Fischer, M. Franklin, R. To, *YFilter: Efficient and Scalable Filtering of XML Documents*, ICDE Conference 2002.

D. Donjerkovic, R. Ramakrishnan, *Probabilistic Optimization of Top N Queries*, VLDB Conference 1999.

F. Fabret, H. Jacobsen, F. Llirbat, J. Pereira, *Filtering Algorithms and Implementation for Very Fast Pubilsh/Subscibe Systems*, SIGMOD Conference 2001.

R. Fagin, A. Lotem, M. Naor, *Optimal aggregation algorithms for middleware*, PODS Conference 2001.

R. Fagin, *combining Fuzzy Information from Multiple Systems*, PODS Conference 1996.

V. Hristidis, N. Koudas, Y. Papakonstantinou, *PREFER: A system for the Efficient Execution of Multiparametric Ranked Queries*, SIGMOD Conference 2001.

H.V. Jagadish, N. Koudas, M. Muthukrishnan, V. Poosala, K. Sevcik, T. Suel, *Optimal Histograms with Quality Guarantees*, VLDB Conference 1998.

C. Li, K. Chen-Chang, I. Ilyas, S. Song, *RankSQL: Query Algebra and Optimization for Relational Top-k Queries*, SIGMOD Conference 2005.

D. Pisinger, *Algorithms for Knapsack Problems*, Ph.D Thesis, 1995.

E. Zemel, *An O(n) Algorithm for the Linear Multiple Choice Knapsack Problem and Related Problems*, Information Processing Letters, 1984.

G. Salton and M. McGill, *Introduction to Modern Information Retrieval*, McGraw-Hill, 1983.

J. Widom, S. Ceri, *Active Database Systems: Triggers and Rules for Advanced Database Processing*, Morgan Kaufmann 1996 [19] P. Valduriez, Joint Indices. ACM Trans. Database Syst. 12(2): 218-246 (1987).

K. Dudzinski, S. Walukiewicz, *Exact Methods for the Knapsack Problem and its Generalizations*, European Journal of Operational Research, 1987.

E. Dyer, *An O(n) Algorithm for the Multiple-Choice Knapsack Linear Program*, Mathematical Programming, 1984.

P. Valudriez, *Join Indices*, ACM Trans. Database Syst. 12(2): 218-246 (1987).

PCT Serial No. PCT/US08/059062, Filed Apr. 1, 2008, Notification of Transmittal of the International Search Report and the Written Opinion of the International Searching Authority, or the Declaration Dated Aug. 18, 2008, pp. 1-10.

PCT Serial No. PCT/US08/059041,Filed Apr. 1, 2008, Notification of Transmittal of the International Search Report and the Written Opinion of the International Searching Authority, or the Declaration Dated Sep. 8, 2008, pp. 1-9.

U.S. Patent and Trademark Office Action dated Dec. 24, 2008 for U.S. Appl. No. 11/595,585.

U.S. Patent and Trademark Office Action dated Jul. 8, 2009 for U.S. Appl. No. 11/734,294.

U.S. Patent and Trademark Office Action dated Aug. 26, 2009 for U.S. Appl. No. 11/595,585.

U.S. Patent and Trademark Final Office Action dated Apr. 15, 2010 for U.S. Appl. No. 11/595,585.

U.S. Patent and Trademark Office Action dated Nov. 30, 2009 for U.S. Appl. No. 11/734,294.

U.S. Patent and Trademark Office Action dated Dec. 24, 2009 for U.S. Appl. No. 11/595,585.

U.S. Patent and Trademark Office Action dated Mar. 29, 2010 for U.S. Appl. No. 11/734,300.

\* cited by examiner

DERIVING USER INTENT FROM A USER QUERY

CROSS REFERENCE TO RELATED APPLICATIONS

This application is a continuation-in-part of U.S. patent application Ser. No. 11/595,585, filed Nov. 9, 2006, hereby incorporated by reference, and claims the benefit therefrom.

BACKGROUND

1. Field of the Invention

The present invention generally relates to a system and method for deriving user intent from a query.

2. Description of Related Art

Online search engines are often used to search the internet for specific content that is of interest to the user. This is generally accomplished by entering keywords into a search field that relate to the specific interest of the user. For example, if the user was interested in finding a recipe for apple pie, the user may enter the keywords "recipe", "apple" and "pie" into the search field. Generally, the search engine would then try to match the entered keywords to web pages that contain the keywords or have been associated with the keywords through some methodology. The user is then provided with a list of search results that are ranked in order with the most relevant search results at the top of the list and the least relevant search results at the bottom of the list. Generally, revenue for the search engines would be generated by advertisements that are placed on the page along with the search results. The user could select the advertisement and be redirected to a web page for the ad sponsor. However, the advertisement may have been randomly selected or may not have been optimally selected based on the user's immediate interest. Therefore, the user may be viewing advertisements for which they have no interest.

In view of the above, it is apparent that there exists a need for an improved system and method for generating advertisements.

SUMMARY

In satisfying the above need, as well as overcoming the drawbacks and other limitations of the related art, the disclosed embodiments relate to a system and method for generating advertisements based on search intent.

The system includes a query engine, a text search engine, and an advertisement engine. The query engine receives a query from the user which is provided to the text search engine to perform a web page search. The query engine further analyzes the query to determine a query intent that is matched to a domain. The query may be further analyzed to derive predicate values based on the query and the domain hierarchy. Various domains may be provided which model typical user interaction, such as searching for a hotel, looking for a plane flight, or shopping for a product. Once a domain is selected, the query may be further analyzed to determine generic domain information such as quantity and price, or domain specific information such as check-in date and check-out date for a hotel stay.

The domain and associated information may then be matched to a list of predefined advertisements. The advertisements may include bids, for example offers to advertise for certain domain, keywords, or combinations for a predefined bid price. The advertisement may be assigned an ad match score based on a correlation between the query information and various listing information provided in the advertisement. As such, the advertisements may be provided in a list, where the list is ranked according to the ad match score. In addition, the system may use a domain hierarchy to determine certain predicate values that may not be provided or which may not otherwise be clear. Further, a refined search interface may be provided including fielded selections based on the domain type. The fielded selections may be automatically determined based on the query information allowing the user to quickly refine his search criteria in a manner that is efficiently and accurately interpreted by the query engine to provide optimal advertisement results.

Further objects, features and advantages of this invention will become readily apparent to persons skilled in the art after a review of the following description, with reference to the drawings and claims that are appended to and form a part of this specification.

DETAILED DESCRIPTION

Figure 1:
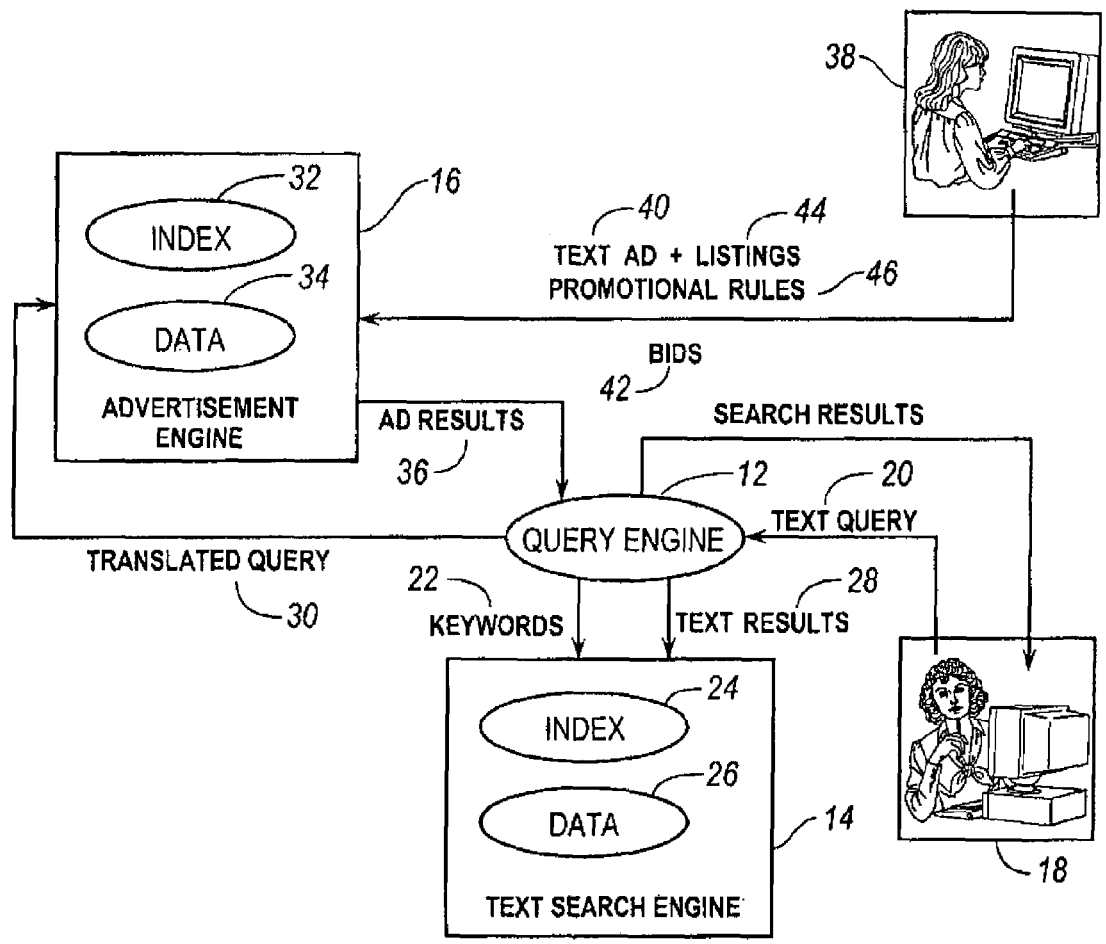
FIG. 1 is a schematic view of an exemplary system for generating advertisement based on query intent.
Figure 2:
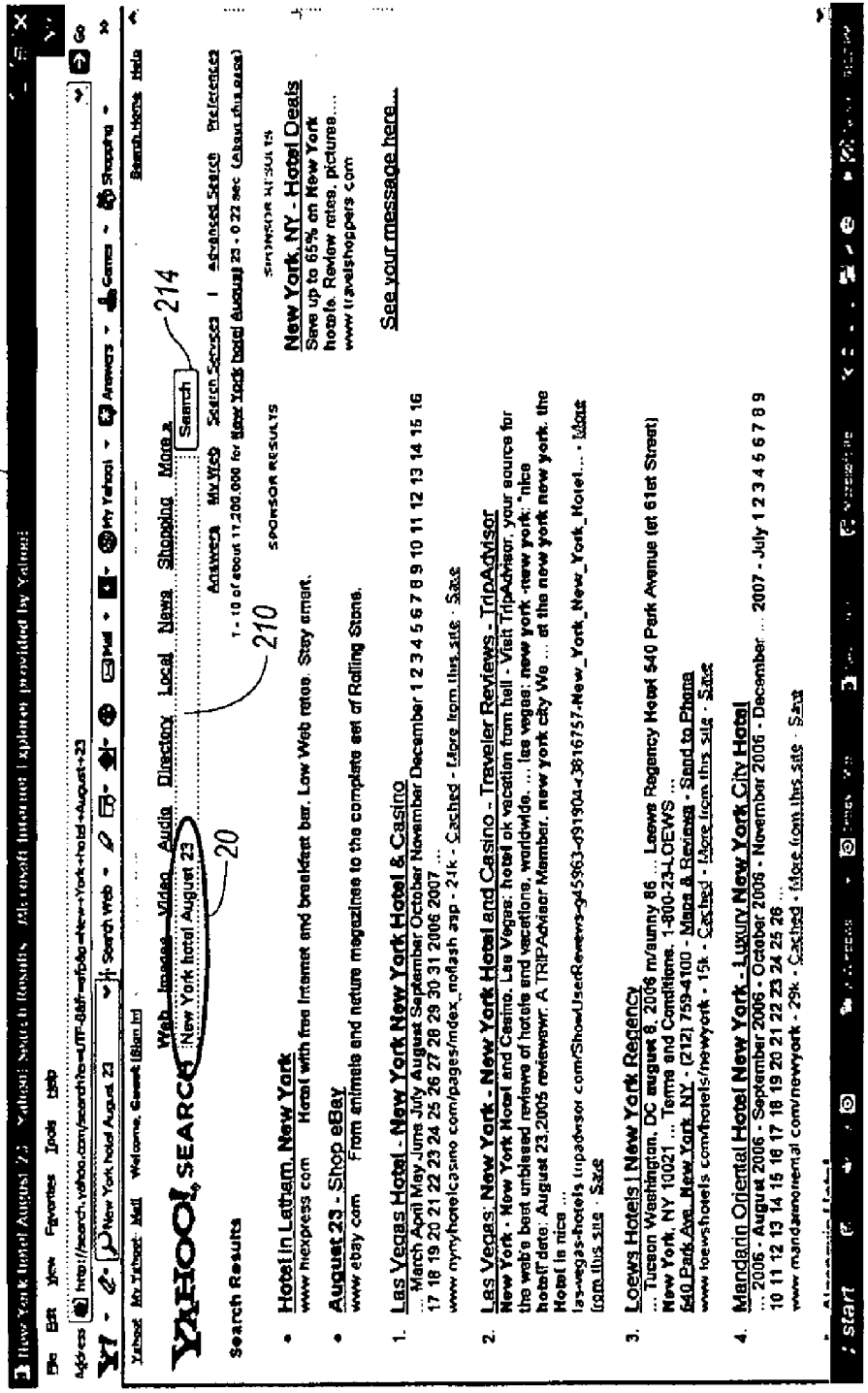
FIG. 2 is an image of an exemplary web page for entering a query.

FIG. 1 shows a system 10, according to one embodiment, which includes a query engine 12, a text search engine 14, and an advertisement engine 16. The query engine 12 is in communication with a user system 18 over a network connection, for example over an Internet connection. The query engine 12 is configured to receive a text query 20 to initiate a web page search. The text query 20 may be a simple text string including one or more keywords that identify the subject matter for which the user wishes to search. For example, the text query 20 may be entered into a text box 210 located at the top of the web page 212, as shown in FIG. 2. In the example shown, five keywords "New York hotel August 23" have been entered into the text box 210 and together form the text query 20. In addition, a search button 214 may be provided. Upon selection of the search button 214, the text query 20 may be sent from the user system 18 to the query engine 12. The text query 20 also referred to as a raw user query, may be simply a list of terms known as keywords.

Referring again to FIG. 1, the query engine 12 provides the text query 20, to the text search engine 14 as denoted by line 22. The text search engine 14 includes an index module 24 and the data module 26. The text search engine 14 compares the keywords 22 to information in the index module 24 to determine the correlation of each index entry relative to the keywords 22 provided from the query engine 12. The text search engine 14 then generates text search results by ordering the index entries into a list from the highest correlating entries to the lowest correlating entries. The text search engine 14 may then access data entries from the data module 26 that correspond to each index entry in the list. Accordingly, the text search engine 14 may generate text search results 28 by merging the corresponding data entries with a list of index entries. The text search results 28 are then provided to the query engine 12 to be formatted and displayed to the user.

The query engine 12 is also in communication with the advertisement engine 16 allowing the query engine 12 to tightly integrate advertisements with the user query and search results. To more effectively select appropriate advertisements that match the user's interest and query intent, the query engine 12 is configured to further analyze the text query 20 and generate a more sophisticated translated query 30. The query intent may be better categorized by defining a number of domains that model typical search scenarios. Typical scenarios may include looking for a hotel room, searching for a plane flight, shopping for a product, or similar scenarios.

One earlier example included the text query "New York hotel August 23". For this example, the query engine 12 may analyze the text query 20 to determine if any of the keywords in the text query 20 match one or more words that are associated with a particular domain. The words that are associated with a particular domain may be referred to as trigger words. Various algorithms may be used to identify the best domain match for a particular set of keywords. For example, certain trigger words may be weighted higher than other trigger words. In addition, if multiple trigger words for a particular domain are included in a text query additional weighting may be given to that domain.

Once a domain has been selected, the keywords may be analyzed to identify known predicates for a particular domain. Predicates are descriptive terms that further identify the product or service being sought by the user. Some predicates are general predicates that may apply to all domains, for example the quantity or price of the product or service. Other predicates are domain specific predicates and fall into specific predefined categories for a particular domain. Referring to the "New York hotel August 23" text query example, once the domain is identified as the hotel domain, certain categories may be predefined that further identify the hotel stay sought, including for example the city, date, cost, etc. Accordingly, one possible format for the translated query may be provided below:

---

A translated user query may be a 4-tuple (kw, domain, gen_pred, dom_pred)
    kw is a list of keywords (from the raw user query)
    domain is the user intent
    gen_pred and dom_pred are propositional logic formulas.
      gen_pred := ε | gen_pred ( ∧ gen_pred) * |
        duration throughout time-range |
        quantity = value:float |
        price-range IN [ value:float , value:float ]
      dom-pred := ε | dom_pred ( ∧ dom_pred) * |
        name:string = value:typedValue |
        name:string IN [ value:typedValue , value:typedValue ]
        name:string IN geographic-area

---

Figure 3:
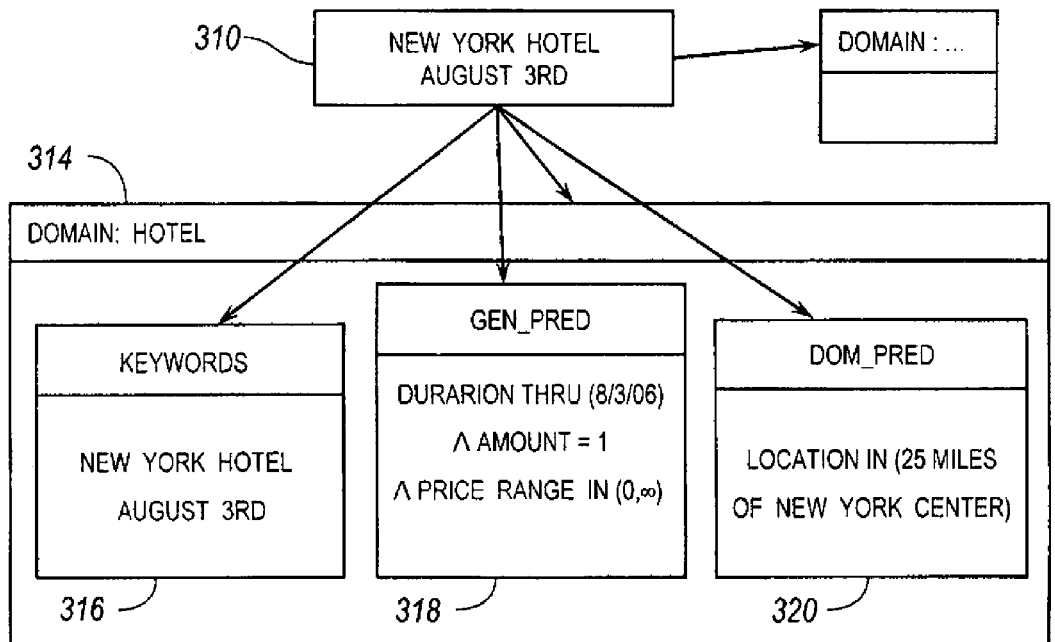
FIG. 3 is a graphical representation of an exemplary translated query.

This concept is further illustrated graphically in FIG. 3. Block 310 represents the text query "New York Hotel August 3". The translated query is denoted by block 312. The domain is denoted by block 314 and is identified as the hotel domain. The keywords "New York", "Hotel", and "August 3" are also included in the translated query as noted by block 316. General predicates 318 may be identified from the text query or keywords including the date of stay "Aug. 3, 2006", the quantity (which may default to 1 for the hotel domain, could be identified by a phrase such as "2 rooms"), and the price range. Further, once the domain is identified as the hotel domain, domain specific predicates 320 can be further formatted for example the city and location (which may default to a value such as within 25 miles of the city center).

Figure 4:
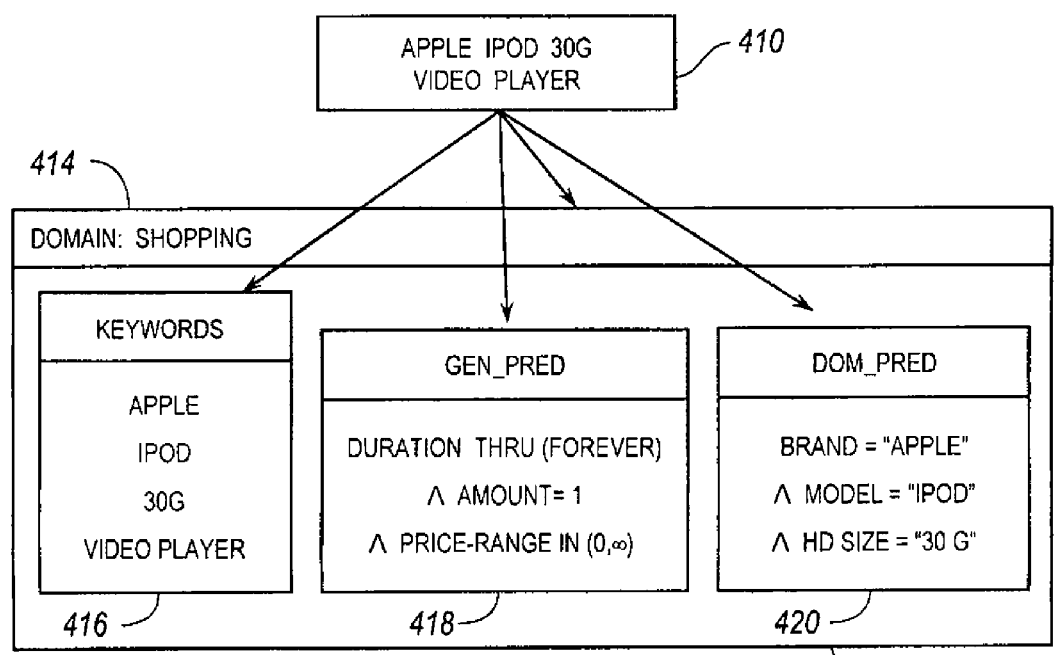
FIG. 4 is another graphical illustration of an exemplary translated query.

Another example, relating to shopping for a product, is provided graphically in FIG. 4. In this example, block 410 represents the text query "Apple iPod 30G video player". The translated query is generally denoted by block 412. The domain 414 is identified as the shopping domain. Also included in the translated query 414 are the keywords 416 including "Apple", "iPod", "30G", and "video player". In this example, the general predicates 418 may include the date offered, the quantity, and the price range, each of which may be derived from the keywords. Since the domain 414 is identified as the shopping domain, the domain specific predicates 420 can be selected based on the shopping domain. The domain specific predicates 420 for the shopping domain may differ significantly from the hotel domain, for example the brand and model of the product. In addition, other predicates may be further specified, for example, based on a hierarchy of domain predicates. Accordingly, once the model predicate is identified as "iPod", the hard drive size predicate can be identified and the keywords may be further analyzed to better specify the product sought. For example, advertisements for Apple iPods may be searched for predicates that include "30 GB" or even just "30". If the primary predicate 30 is consistently found as a hard drive size, the value of the hard drive size predicate may be set to 30 GB. Similarly, if the query did not include Apple but just iPod. The advertisements may be analyzed for the term "iPod". The term iPod may consistently occur in the domain hierarchy under Manufacturer=Apple. Accordingly Apple may be derived as the Manufacturer and the query updated accordingly. This technique will be discussed in greater detail below.

Referring again to FIG. 1, the translated query 30 is provided to the advertisement engine 16. The advertisement engine 16 includes an index module 32 and a data module 34. The advertisement engine 16 performs an ad matching algorithm to identify advertisements that match the user's interest and the query intent. The advertisement engine 16 compares the translated query 30 to information in the index module 32 to determine the correlation of each index entry relative to the translated query 30 provided from the query engine 12. The scoring of the index entries may be based on an ad matching algorithm that may consider the domain, keywords, and predicates of the translated query, as well as the bids and listings of the advertisement. The bids are requests from an advertiser to place an advertisement. These requests may typically be related domains, keywords, or a combination of domains and keywords. Each bid may have an associated bid price for each selected domain, keyword, or combination relating to the price the advertiser will pay to have the advertisement displayed. Listings provide additional specific information about the products or services being offered by the advertiser. The listing information may be compared with the predicate information in the translated query to match the advertisement with the query. An advertiser system 38 allows advertisers to edit ad text 40, bids 42, listings 44, and rules 46. The ad text 40 may include fields that incorporate, domain, general predicate, domain specific predicate, bid, listing or promotional rule information into the ad text.

Figure 5:
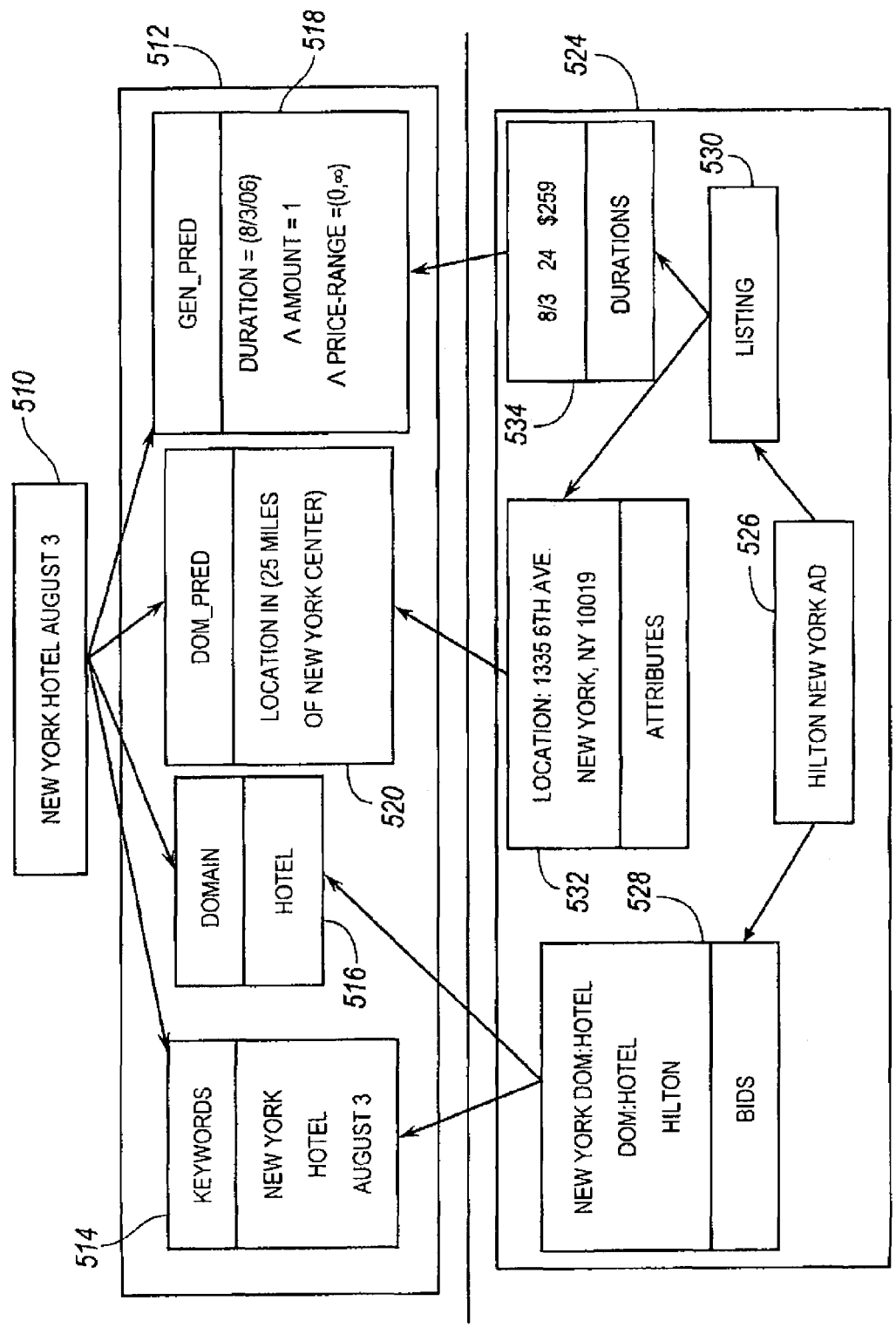
FIG. 5 is a graphical illustration of one example of matching a translated query to an advertisement.

Referring to FIG. 5, an ad matching scenario is illustrated graphically. Block 510 represents the raw text query "New York Hotel August 3" and, as previously discussed, is used to generate the translated query 512. The advertisement 524 acts as a counterpart to translated query 512. In one example of the system, the advertisement 512 is defined as:

```
a,5-tuple (title, desc, url, bids, listings)
    title: string
    desc: string description of the product, service, or offer
    url: URL which points to the webpage of the ad
    bids: { domain terms* | term+ } the bidded terms and domain
    listings: { listing }
```

Further, the listing may be:

```
a pair (attributes, duration)
    attributes: { (name:string, value:typedValue) } which describes features
    of the ad listing
    duration: { (time:duration, amount:float, price:float ) } which describe
    the price and availability of the ad listing for a time duration
```

Accordingly, the advertisement 524 in FIG. 5, graphically illustrates a title 526, bids 528, and listings 530.

The translated query 512 is matched to the advertisement 524 to determine an ad match score indicative of the correlation between the product or service being offered and the query intent. The bids 528 form part of the advertisement 524 and may be matched to the keywords and domain of the translated query 512. The keywords 516 include the terms "New York", "Hotel", and "August 3". Similarly, the bids 528 includes a bid on the combination of the Domain "Hotel" and the keyword "New York", accordingly these bids are compared to the keywords 514 and domain 516 of the translated query 512. Since there is a match to both the domain and keyword the ad match score is higher than if just the domain Hotel had matched. Generally, the more specific the bid, the higher the bid price will be because the more relevant the advertisement will be to the query intent and the more likely the user will purchase the advertised product or service. The bid price may also be included in calculating the ad match score and/or used to order the ads within a list that is displayed with the search results. It will be clear to one of ordinary skill in the art that other bidding models may also be applied, including bidding models that match bids to general or domain specific predicates.

To further define the ad match score, the predicates 518, 520 of the translated query 512 may be compared with the listings 530 of the advertisement 524. One or more listings 530 may be related to a particular domain type. Further, each listing 530 may be related to a particular product or service for sale by the advertiser. General predicates may be identified from the text query or keywords including the date of stay "Aug. 3, 2006", the quantity, and the price range, as denoted by block 518. Similarly, the domain specific predicates 520, for example the city and location, can also be generated based on the keywords 514. Accordingly, the attributes 532 of each listing 530 of the advertisement 524, such as the address "1335 6$^{th}$ Ave. New York, N.Y. 10019" may be matched to the domain specific predicates 520 to improve the ad match score of the advertisement. In addition, the durations 534, such as the date, quantity available, and advertised price, may also be matched to the general predicates 518 of the translated query 512, to further define the ad match score.

In one example, the add matching algorithm may be defined as:
  Given a user query Q=(kw, domain, gen_pred, dom_pred)
    Let gen_pred.amount return the number of items wanted
    Let gen_pred.duration return the time duration of the items
    Let gen_pred.price_range return the price range accepted by the user
  Given a set of ads Ads={(title, desc, url, bids, listings)} where listings={(A, D)} and A=Attributes and P=Durations
    Given d in D. let d.duration return an available time duration of the item
    Given d in D. let d.amount return the available amount of the item during the time p.duration
    Given d in D. let d.price return the price of the item during the time p.duration
  Where the following predicates are define
    satisfy_domain(I.A, Q.dom_pred) returns true iff the attributes of a listing I satisfies the domain predicates of Q
    satisfy_general(P, Q.gen_pred) returns true iff all duration tuples (D) of a listing satisfy the general predicates of Q. Specifically, $$\text{satisfy\_general}(D,gp) = \forall d \in D.(d.amount \geq gp.amount \land d.duration \in gp.duration \land d.price \in gp.price\_range \land \forall c \in chronons(gp.duration).\exists d' \in D.(c \in d'.duration))$$

satisfy(I, Q, D') return true iff a listing I satisfies the domain predicate of Q and all duration tuples in D' satisfy the general predicate of Q. Specifically, $$\text{satisfy}(l,Q,D') = \text{satisfy\_domain}(l,A,Q.dom\_pred) \land D' \subseteq l,D.(\text{satisfy\_general}(D',Q.gen\_pred))$$

Given a query Q and a set of ads Ads, Match(Q, Ads) defines the set of matching ads of the query Q $$\text{Match}(Q,Ads) = \{(title,desc,url,listings) \mid \exists ad \in Ads.(title = ad.title \land desc = ad.desc \land url = ad.url \land \exists t \in ad.bids.(contains(Q.terms,t.terms)) \land (t.domain = null \lor t.domain = Q.domain)) \land listings = \{(l,A,D) \mid l \in ad.listings \land \text{satisfy}(l,Q,D)\}\}$$

Further, rules may be defined by the advertiser and applied to the advertisement to provide the user special offers. The rules may be implemented based on information provided in the translated query. In one example, each rule is defined as:
  a pair (condition, action)
where the condition is something to be fulfilled by the user and the action is an offer that the advertiser will provide in response to the condition being fulfilled.

The system 10 may be configured such that the user system 18 may directly initiate a purchase from the advertisement. Accordingly, the rule may be formatted into the advertisement and applied by the query engine 12. This may result in both the regular price and a discounted price being displayed based on analysis of the predicates. In one example, the rule may be a total price rule that affects the price of a multi quantity or multi item transaction. For example, the advertisement may incorporate a phrase such as "You will get 5% off if you stay for 2 nights or longer" and accordingly the query engine may apply the discount to the purchase. Similarly, the advertisement may incorporate a phrase such as "Get $20 off when your order is $100 or more" and the query may deduct the discount from the transaction if the condition is fulfilled. In one example, total-price rules (TP) take as inputs a user query Q, a set of listing attributes A and a total price of the order tprice, as further defined below:

```
TP-rule(Q,A,tprice) = (TP-cond, afunc)
TP-cond           = TP-pred (/\ TP-pred)*
TP-pred           = Q.domain=name:domain (/\ attribute-pred )* |
    genAttrName = value:float |
    genAttrName IN [ value:float, value:float]
genAttrName = Q.quantity | total-price | Q.duration
attribute-pred= A.name:string = value:typedValue |
    A.name:string IN [ value:typedValue, value:typedValue]
    A.name:string IN geographic-area
afunc = genAttrName | A.name | constant:numeric |
    afunc * afunc | afunc + afunc | afunc ^ afunc |
    afunc div afunc | afunc mod afunc
```

Another rule may be a bonus rule. Bonus rules may provide a secondary or unrelated benefit to the user when the condition is fulfilled. For example, the advertisement may incorporate a phrase such as "You will get free parking if you stay in our studio for 2 nights" or "You will receive free shipping on your order of $48.95 or more". Accordingly, the query engine 12 may add the additional item to the order at no charge or included at the special price when the condition is fulfilled by the user. In one example, bonus rules take as inputs a user query Q, a set of listing attributes A and a total price of the order tprice, as defined below:

Bonus-rule(Q,A,tprice)=(TP-cond, bonus: String)

Yet another rule may include a duration rule. The duration rule may provide a discount based on a length of stay. For example, the advertisement may incorporate a phrase such as "You will get 10% off for weekday stays in our hotel". Accordingly, the discount may be applied if the selected duration of the stay meets the duration rule defined by the advertiser. In one example, Duration rules (DR) take as inputs a user query Q, a set of attributes A, a time duration and a price of the listing in the time duration, as further defined below:

DR-rule(Q,A,duration,price)=(DR-cond, afunc)
DR-cond=DR-pred (∧(DR-pred|TP-pred))*
DR-pred=duration IN time_range|price IN [value:float, value:float]
time_range={value:duration (, value:duration)*}

The system may apply certain assumptions to the application of the aforementioned rules. For example the system may apply a limit of one duration rule on each time duration. Similarly the system may be configured to apply a limit of one total-price rule on each order.

In yet another exemplary system, the match algorithm may be performed first to generate a list of applicable advertisements. Next the advertisement engine may apply the set of duration rules. Then the set of total-price rules may be applied to the list of advertisements. Finally the advertisement engine may choose the result with the minimum total price or rank the results from lowest to highest price. Accordingly, one implementation of the duration rules may be defined as provided below:

Based on Match(Q, Ads)
For each time duration of a listing, generate the set of all potential promotional prices (PSet)

Match(Q,Ads,DR) = {(title,desc,url,listings) | ∃ad ∈ Match(Q,Ads).
title = ad.title ∧ desc = ad.desc ∧ url = ad.url ∧ listings = {(l,A,PSet) |
∃l ∈ ad.listings.(PSet = {P | ∃d ∈ l.D.(P = {price | price = d.price ∨
∃dr ∈ DR.(dr[Q,l.A,d.time,d.price].condition ∧
price = dr[Q,l.A,d.time,d.price].action)})}}}

Further, for an implementation where the advertisement is matched with duration rules and total price rules the following additional procedure may also be implemented.

Based on Match(Q, Ads, DR)
For each listing, output the lowest total price
Given a set of set P, rep(P) is a multi-set s.t.

$$\forall r \in rep(P). \exists p \in P.(r \in P) \wedge \forall p \in P. \exists r \in rep(P).(r \in P) \wedge |rep(P)|=|P|$$

$$\text{Match (Q, Ads, DR, TR)} = \left\{ (\text{title, desc, url, listings}) \mid \exists \text{ ad} \in \text{Match (Q,} \right.$$

$$\text{Ads, DR). title} = \text{ad.title} \wedge \text{desc} = \text{ad.desc} \wedge \text{url} = \text{ad.url} \wedge \text{listings} = \left\{ (l.A, \right.$$

$$\text{tprice}) \left| \exists l \in \text{ad.listings} \left( \text{TPSet} = \left\{ \sum_{r \in R} r \mid R \in \text{rep(l.PSet)} \right\} \wedge \text{DRSet} = \right.$$

$$\{p \mid \exists \text{ tprice} \in \text{TPSet}.(p = \text{tprice} \vee \exists \text{ tp} \in \text{TP}.(\text{tp}(Q, l.A, \text{tprice}).\text{condition} \wedge$$

$$\left. \left. p = \text{tp}(Q, l.A, \text{tprice}).\text{action}) \right\} \wedge \text{tprice} = \text{MIN(DRSet)} \right\} \right\}$$

For the implementation described above, Match(Q,Ads) returns the (title, desc, url, listings) of each ad in the set of available Ads such that this ad satisfies the following conditions: some of the ad's bidded terms are contained in the query terms, the domain of those bidded terms is the same as the query domain, and the listings are defined as all listings which satisfy satisfy(I,Q,D). Further, if no listing exists in the ad which satisfies satisfy(I,Q,D), no listing is returned for that ad. The process satisfy(I,Q,D) recieves a listing I, a query Q and all duration tuples of I, and checks if the listing satisfies the domain predicates of Q (satisfy_domain(I.A, Q.dom_pred)) and the general predicates of Q (satisfy(D, gp)). Only the formula for the general predicates satisfaction is provided since the domain predicates satisfaction changes based on each domain. The process satisfy_general(D,gp) checks if all the durations in a listing I satisfy the amount, the duration and the price predicates.

The advertisement engine 16 may then generate advertisement search results 36 by ordering the index entries into a list from the highest correlating entries to the lowest correlating entries. The advertisement engine 16 may then access data entries from the data module 34 that correspond to each index entry in the list from the index module 32. Accordingly, the advertisement engine 16 may generate advertisement results 36 by merging the corresponding data entries with a list of index entries. The advertisement results 36 are then provided to the query engine 12. The advertisement results 36 may be incorporated with the text search results 28 and provided to the user system 18 for display to the user.

As described above, certain predicate values may be derived based on the domain hierarchy and the query. In one example, the dependency ordering for a car domain is manufacturer→make→model→year. This also defines the domain hierarchy for the cars domain. Accordingly, if the database included the tuples shown in Table 1, the system could derive certain predicate values based on the hierarchy and the information provided.

TABLE 1

| Tuples | Manufacturer | Make | Model | Year |
|---|---|---|---|---|
| $t_0$ | Honda | Honda | Civic | 2007 |
| $t_1$ | Honda | Honda | Accord | 2007 |
| $t_2$ | Honda | Acura | Xyz | 2006 |
| $t_3$ | Toyota | Camry | Xyz | 2007 |
| $t_4$ | General Motors | Chevrolet | Tahoe | 2007 |

Figure 6:
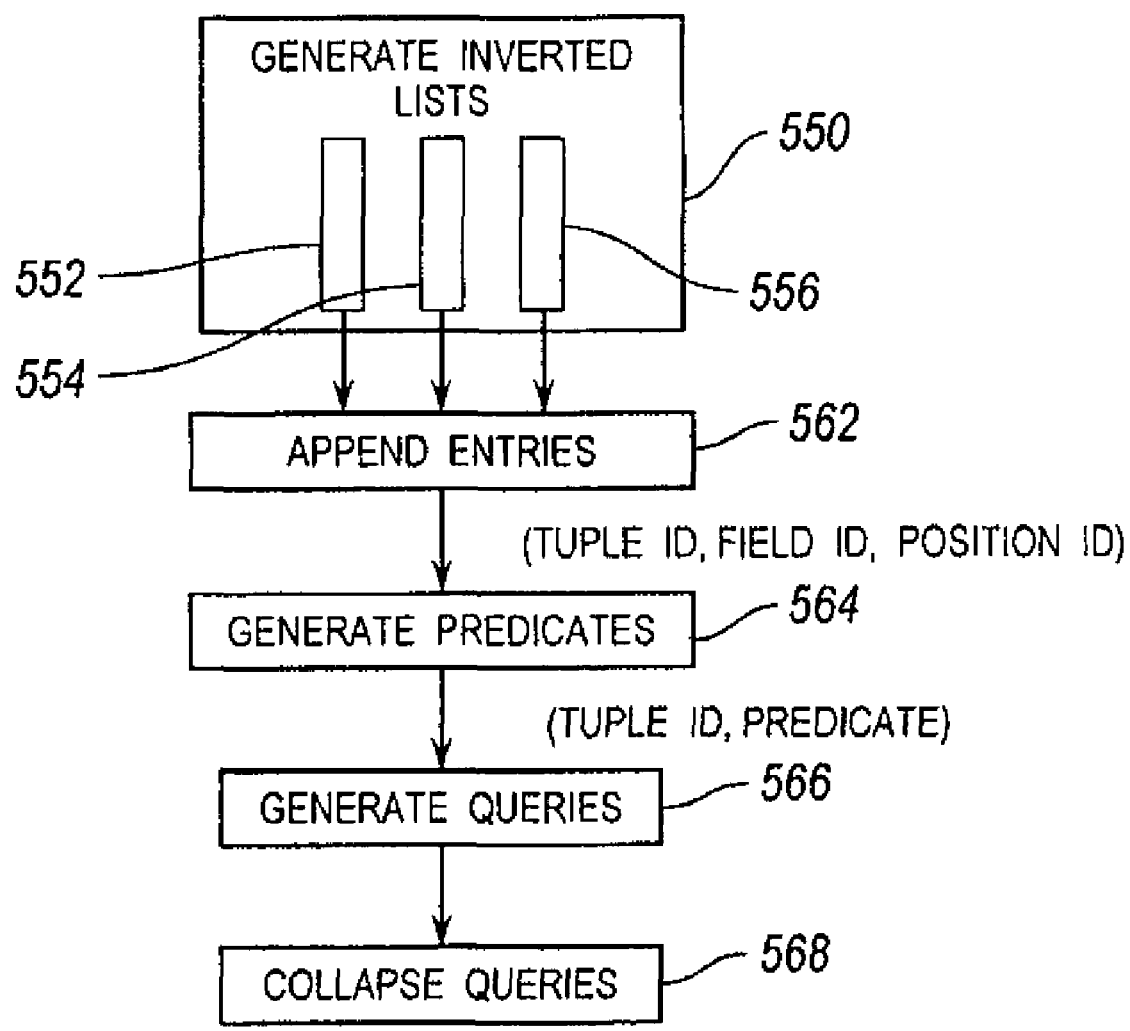
FIG. 6 is a graphical illustration of one example of a method for inferring predicate values from the query.
Figure 7:
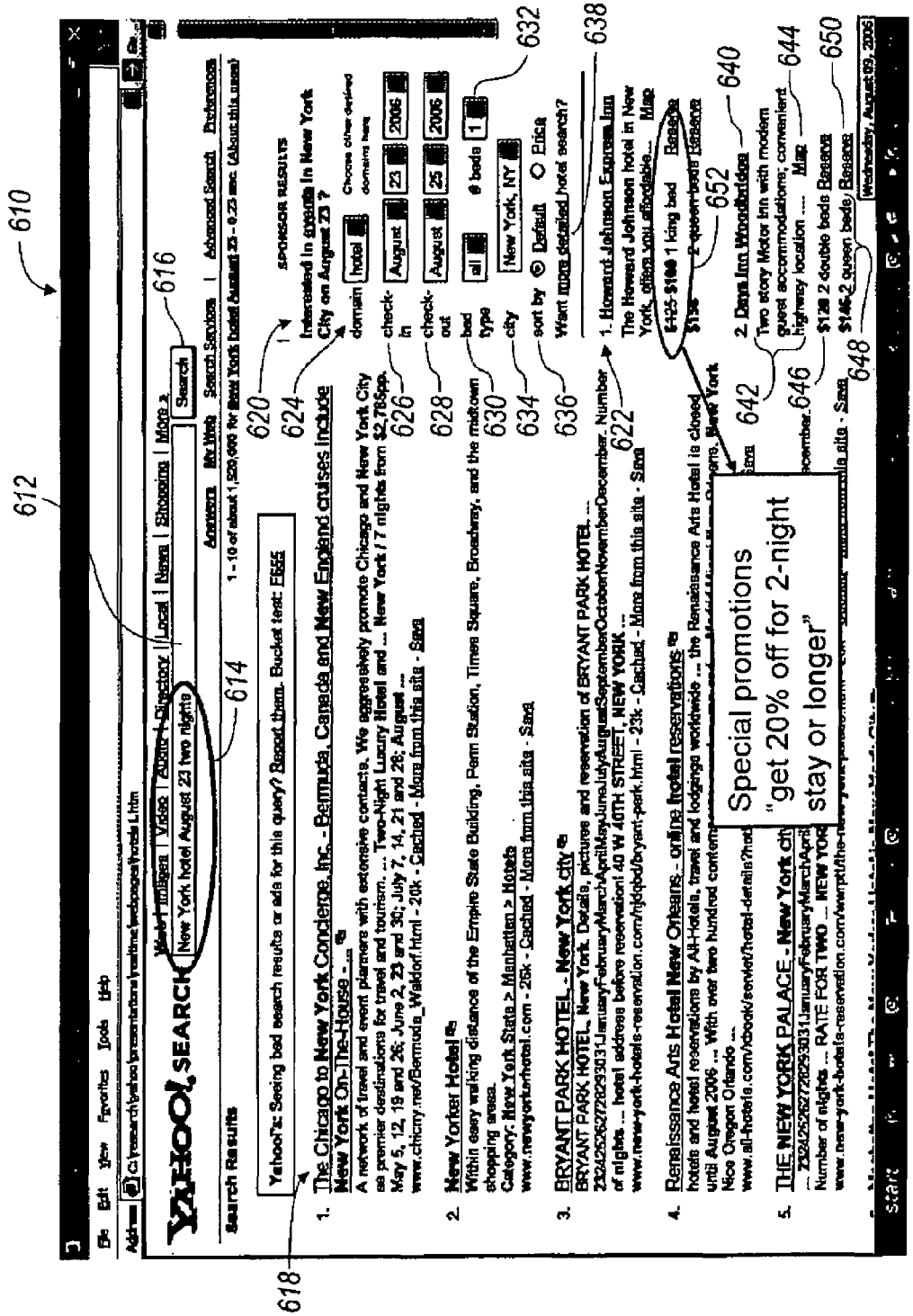
FIG. 7 is an image of an exemplary display including advertisement results and a refined search interface.

In FIG. 6, a method is provided for generating query criteria based on the derived predicate values. The method starts by generating inverted lists for each of the keywords, as denoted by block 550. Samples of inverted lists for the tuples $t_0$-$t_4$ are provided in Table 2.

TABLE 2

| Honda | $(t_0, 1, 1)$ | $(t_0, 2, 1)$ | $(t_1, 1, 1)$ | $(t_0, 2, 1)$ | $(t_2, 1, 1)$ |
|---|---|---|---|---|---|
| Civic | $(t_0, 3, 1)$ | | | | |
| Accord | $(t_2, 3, 1)$ | | | | |
| Toyota | $(t_3, 1, 1)$ | | | | |
| General | $(t_4, 1, 1)$ | | | | |
| Motors | $(t_4, 1, 2)$ | | | | |

The inverted lists are organized as a collection of tupleIds, fieldIds, and positionIds. Accordingly, for the tuples provided in Table 1, the term Civic is located in tuple 0, field 3, position 1 which is denoted as $(t_0, 3, 1)$. Similarly, it can be seen that the term Honda is located at five positions within the database entries. An inverted list is generated for each term in the query as denoted by list 552, 554, and 556. In block 562, the lists for each term are appended into a single list. Accordingly, the tupleId, fieldId, and postionId is provided to block 564. In block 564, predicates are generated based on the appended inverted list. Any redundancies may be removed and the term is associated with and/or verified as an appropriate value for its field. Accordingly, a tupield and predicate list is provided to block 566. Queries are generated for each entry in the list. As such, values for predicates may be inferred based on the hierarchy. For example, if the query includes the term Civic, $t_0$ will be referenced and Honda will be inferred as the Make and Manufacturer. This will be repeated for each entry in the list. In block 568, each of the queries generated are checked for consistency. Consistent queries are collapsed into a single query, while inconsistent queries remain separate and are added to a query list. The system may then process the query list or update query controls to reflect derived query values (as shown in FIG. 6).

The examples from Table 3 will further illustrate the concept. For the query "Civic", only one inverted list for Civic is used. Only one query is generated for $(t_0, 3, 1)$. As such, Honda is derived for make and manufacturer. Since no inconsistencies exist with other queries, a single query results.

TABLE 3

| | Derived Queries | | |
|---|---|---|---|
| Queries | Manufacturer | Make | Model |
| Civic | Honda | Honda | Civic |
| Toyota Civic | Toyota | | |
| | Honda | Honda | Civic |
| Civic Accord | Honda | Honda | Accord |
| | Honda | Honda | Civic |
| Honda Civic | Honda | Honda | Civic |
| General Motors | General Motors | | |
| CVC | Honda | Honda | Civic |

For the query "Toyota Civic", two inverted lists are used, the Toyota inverted list, and the Civic inverted list. Both inverted lists are appended and queries are generated for each entry. For entry ($t_0$, 3, 1) the query is Manufacturer=Honda, Make=Honda, Model=Civic, whereas for entry ($t_3$, 1, 1) the query is Manufacturer=Toyota. Since the manufacturer differs between the two queries, they are inconsistent and both queries are added to the query list. Where queries are inconsistent, the query controls may be updated with the highest common consistent terms. Since here there are no consistent terms, the controls would contain the default or blank values. In a similar example, all consistent terms are used to update the query controls. A query of "Toyota, Civic, 2007" would only have the term 2007 as a consistent predicate between the two generated queries. Accordingly, the year control could be set to "2007", while the manufacturer, make, and model control contain the default values.

Relative to the query "Civic Accord", both the Civic and Accord inverted lists are appended. For entry ($t_0$, 3, 1) the query Honda, Honda, Civic is generated, while for entry ($t_1$, 3, 1) the query Honda, Honda, Accord is generated. Comparing these queries, the model is inconsistent and, therefore, both queries would be added to the query list. However, the query controls may be updated to reflect the highest order consistent predicate, in this case manufacture equals Honda, make equals Honda.

In the query "Honda Civic", both the Honda and Civic inverted lists would be utilized. The queries generated would include:
($t_0$, 1, 1)=Honda
($t_0$, 2, 1)=Honda, Honda
($t_1$, 1, 1)=Honda
($t_1$, 2, 1)=Honda, Honda
($t_2$, 1, 1)=Honda
($t_0$, 3, 1)=Honda, Honda, Civic.

Accordingly, here none of the values of the queries within the manufacturer, make, or model are inconsistent. Therefore, all of these queries may be collapsed into a single query with the derived values of Honda for manufacturer, Honda for make, Civic for model.

In another example, the system may recognize separate keywords that form a single term. For example, for the keywords General Motors, both General and Motors would be found in tuple 4 and generate entries ($t_4$, 1, 1) and ($t_4$, 1, 2). The predicate generated would be General Motors for both entries. Since both entries are consistent having manufacturer=General Motors, the queries would be collapsed and the derived manufacturer value would be General Motors. In a similar scenario, various abbreviations may also be preprocessed and related to common terms. For example, CVC may be a common abbreviation for Civic and, therefore, may be flagged and replaced by the term Civic for identifying the inverted lists and generating queries. In addition, the system may be combined with a spell checking component to provide suggestions for misspelled keywords.

The query engine 12 may format the advertisement results 36 and the search results 28 to be displayed to the user by the user system 18. One example of a display generated by the query engine 12 is illustrated in FIG. 6. The display 610 may be a web page provided from the query engine 12 to the user system 18. To initiate additional searches, the display 610 includes a query input 612 containing the previous text query 614 and a search button 616, allowing the user to modify the previous search and initiate a new search. In addition, the display 610 includes a list of text search results 618 and a list of advertisement results 622.

The list of text search results 618 is provided in a ranked order based on the correlation item found with the text query 614 as described above. Similarly, the advertisement results 622 are provided in ranked order based on ad match score, also previously described. Further, a refined search interface 620 is provided to allow the user to more specifically identify products or services of interest. The refined search interface 620 may include field drop down selections, option selections, buttons, links, and other similar interface controls. The controls and their contents may be formatted and automatically filled based on a predefined model for the domain and the translated query information including the domain, the keywords, the predicates, or any combination thereof. Further, as described above query information and derived predicate information may be used to set the value of the controls. In addition, if more than one query is generated by the intent derivation algorithm, then the maximum overlapping query is used to set the controls.

In the example shown, a domain control 624 is provided as a drop down selection including the hotel domain based on the previous hotel example described. Further, the domain control 624 allows the user to quickly change the domain for the query and initiate a new search. This will efficiently allow the advertisement engine 16 to update the advertisement results 36 to match the query intent. A check-in date control 626 is provided including drop down selections for the month, day, and year. As can be seen from the entered text query, the check-in month and date can be defaulted to "August 23" based on the keywords provided, while the year can be defaulted to the current year according to default schemes for the particular domain. Similarly, a check-out date control 628 is also provided including the month, day, and year. Accordingly, the query engine 12 may derive the check-out date based on the check-in date and the keywords "two nights". Accordingly, the query engine 12 may automatically set the check-out date control 628 to Aug. 25, 2006. In addition, the refined search interface 620 may include a bed type control 630 and a number of beds control 632 that may be set to default values based on the text information provided, although one of ordinary skill in the art could certainly understand that schemes could be provided to determine the bed type and number of beds from the keywords based on entries such as "two queens" or "two beds". The city control 634 may also be defaulted to "New York, N.Y." based on the keywords provided for the given translated query. Option buttons may also be provided to select between a limited number of criteria such as the sort control 636 allowing the user to sort by ad match score or price. In addition, a button or link may also be provided to initiate a new search based on the fielded entries of the refined search interface 620, as denoted by link 638. The refined search interface 620 with, predefined fielded keywords, allow the user to quickly switch between domains and identify specific features of the product or service that they are looking for while allowing the query engine 12 to efficiently and effectively match advertisements according to the user's interest.

The ad search results 622 are also formatted for ease of use. Based on the ad format, each advertisement may be provided with a title 640 including an underlying URL or link. Each ad includes a description 642 that may be integrated with specific ad or bid information based on the translated query, including the domain, keywords, or predicates. In addition, a map link 644 may be provided where appropriate. To allow the user to quickly and effectively obtain the product or service being advertised, multiple offers may be provided in the advertisement based on the listings and the predicates. Accordingly, a price 646 may be provided along with attribute information 648 such as the number of beds. Further, a control 650 such as a link or button may be provided to immediately reserve or purchase the product or service based on pre-obtained account information or by initiating a purchase process based on the selection. Further, rules may be applied to the listings based on the predicate information to identify and display special offers to the user. A discounted price 652 is provided to illustrate a rule that provides the user a discount based on the check-in and check-out date indicated by the user. Accordingly, the display 610 allows the user to quickly and effectively review search results, ad results, and refine search criteria using the refined search interface 620 to identify products and services of interest.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A method for deriving user intent from a query, the method comprising the steps of:
   defining a plurality of domains that correspond to a plurality of possible user intents, each domain having a hierarchy of predicates;
   receiving a query from the user, the query containing a plurality of keywords; and
   selecting a domain based on the query and the hierarchy of predicates;
   determining if at least one term in the query matches at least one predicate value of an entry;

determining a corresponding position in the hierarchy for the at least one predicate value matching the at least one term in the query;

generating inverted lists for each keyword of the plurality of keywords based on the hierarchy;

generating a plurality of queries wherein a query of the plurality of queries is generated for each entry in the inverted list, wherein a web page is updated based on at least one query of the plurality of queries.

2. The method according to claim 1, further comprising determining a value of predicates in the hierarchy located above the corresponding position of the predicate value based on the predicate value and the hierarchy.

3. The method according to claim 1, further comprising determining a value of predicates in the hierarchy located below the corresponding position of the predicate value based on the query and the hierarchy.

4. The method according to claim 1, further comprising combining the plurality of queries.

5. The method according to claim 4, wherein combining the plurality of queries includes merging at least two queries of the plurality of queries if no inconsistencies exist between the at least two queries.

6. The method according to claim 4, further comprising performing plurality of queries.

7. The method according to claim 4, further comprising updating query interface controls based on the plurality of queries.

8. The method according to claim 7, wherein the query interface controls are updated based on consistent predicates between the plurality of queries.

9. A system for generating advertisements for display to a user, the system comprising:
a computer system including;
a query engine configured to receive a query over a network connection from the user, the query including a plurality of keywords, the query engine being configured to identify a domain based on the query; and
an advertisement selection engine in communication with the query engine, the advertisement selection engine selecting a domain based on the query and a hierarchy of predicates for the domain;
wherein the advertisement engine is configured to determine if at least one term in the query matches at least one predicate value of an entry, the advertisement engine being configured to determine a corresponding position in the hierarchy for the at least one predicate value matching the at least one term in the query, wherein the advertisement engine generates inverted lists for each keyword of the plurality of keywords based on the hierarchy and generates a plurality of queries wherein a query of the plurality of queries is generated for each entry in the inverted list, wherein a web page is updated based on at least one query of the plurality of queries.

10. The system according to claim 9, wherein the advertisement engine is configured to determine a value of predicates in the hierarchy located above the corresponding position of the predicate value based on the predicate value and the hierarchy.

11. The system according to claim 10, wherein the advertisement engine is configured to determine a value of predicates in the hierarchy located below the corresponding position of the predicate value based on the query and the hierarchy.

12. The system according to claim 9, wherein the advertisement engine includes a query combination block configured to combine the plurality of queries.

13. The system according to claim 12, wherein the query combination block merges at least two queries of the plurality of queries if no inconsistencies exist between the at least two queries.

14. The system according to claim 12, wherein the advertisement engine performs the plurality of queries.

15. The system according to claim 9, wherein the advertisement engine updates the query interface controls based on consistent predicates between the plurality of queries.

16. In a computer readable storage medium having stored therein instructions executable by a programmed processor for deriving user intent from a query, the storage medium comprising instructions for:
defining a plurality of domains that correspond to a plurality of possible user intents, each domain having a hierarchy of predicates;
receiving a query from the user, the query containing a plurality of keywords; and
selecting a domain based on the query and the hierarchy of predicates;
determining if at least one term in the query matches at least one predicate value of an entry;
determining a corresponding position in the hierarchy for the at least one predicate value matching the at least one term in the query;
generating inverted lists for each keyword of the plurality of keywords based on the hierarchy;
generating a plurality of queries wherein a query of the plurality of queries is generated for each entry in the inverted list, wherein a web page is updated based on at least one query of the plurality of queries.

17. The computer readable medium according to claim 16, further comprising instructions for determining a value of predicates in the hierarchy located above the corresponding position of the predicate value based on the predicate value and the hierarchy.

18. The computer readable medium according to claim 16, further comprising instructions for determining a value of predicates in the hierarchy located below the corresponding position of the predicate value based on the query and the hierarchy.

19. The computer readable medium according to claim 16, further comprising instructions for combining the plurality of queries.

20. The computer readable medium according to claim 19, wherein instructions for combining the plurality of queries includes instructions for merging at least two queries of the plurality of queries if no inconsistencies exist between the at least two queries.

21. The computer readable medium according to claim 19, further comprising instructions for performing plurality of queries.

22. The computer readable medium according to claim 16, wherein the query interface controls are updated based on consistent predicates between the plurality of queries.

* * * * *